United States Patent

Gold et al.

[11] Patent Number: 5,825,540
[45] Date of Patent: Oct. 20, 1998

[54] AUTOSTEREOSCOPIC DISPLAY AND METHOD

[75] Inventors: Ronald S. Gold, Fullerton; Jerry E. Freeman, Irvine, both of Calif.

[73] Assignee: Raytheon Company, El Segundo, Calif.

[21] Appl. No.: 636,198

[22] Filed: Apr. 22, 1996

[51] Int. Cl.⁶ .................................................. G02B 27/22
[52] U.S. Cl. ........................... 359/462; 359/23; 359/463; 352/57; 353/7
[58] Field of Search .............................. 359/23, 462, 463, 359/464, 458, 376, 377, 378, 407, 403, 404; 345/1, 4, 6; 348/51, 52, 55; 352/57, 60, 61, 62, 63; 353/7

[56] References Cited

U.S. PATENT DOCUMENTS 749,754   1/1904  Spear ........................................ 359/403
5,365,294  11/1994 Anderson ................................. 354/112

FOREIGN PATENT DOCUMENTS

93/19394  9/1993  WIPO ............................. G02B 27/22
94/20875  9/1994  WIPO .

*Primary Examiner*—John W. Henry
*Assistant Examiner*—Darren E. Schuberg
*Attorney, Agent, or Firm*—Leonard A. Alkov; William C. Schubert; Glenn H. Lenzen, Jr.

[57] ABSTRACT

An autostereoscopic display includes a projection system which generates a plurality of real images that represent different spatial views of an object and further includes a plurality of contiguous field lenses. From the real images, the field lenses form a plurality of exit pupils which are separated by one interpupillary distance. An observer can "walk around" the display and observe different stereoscopic views of the object by positioning his eyes at an adjacent pair of exit pupils.

37 Claims, 4 Drawing Sheets

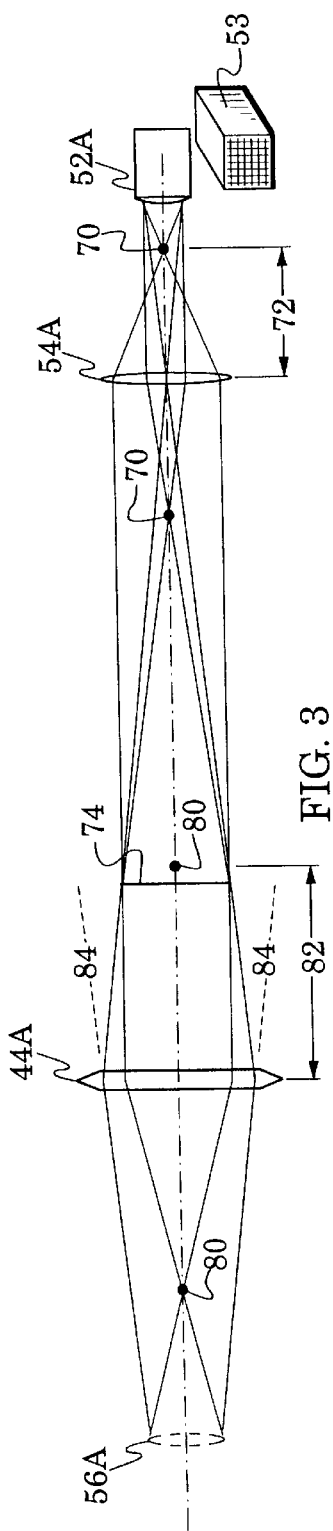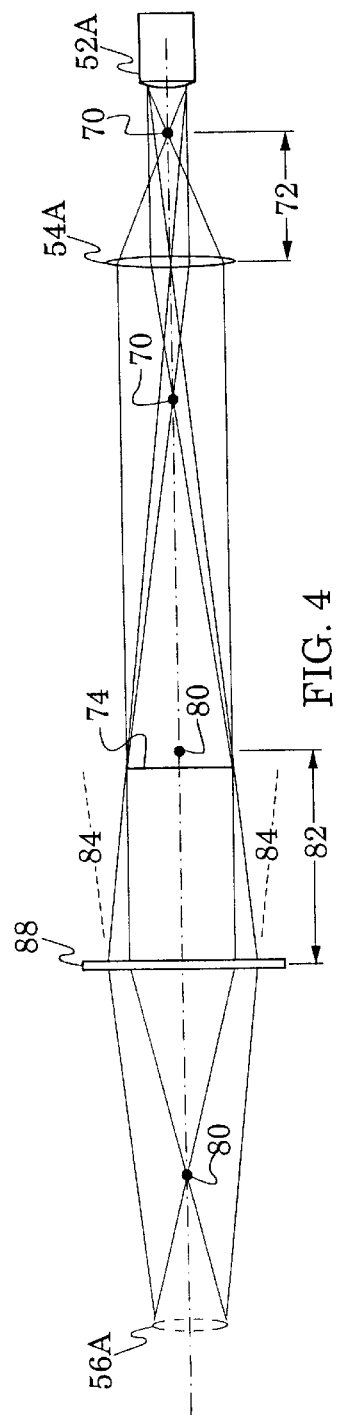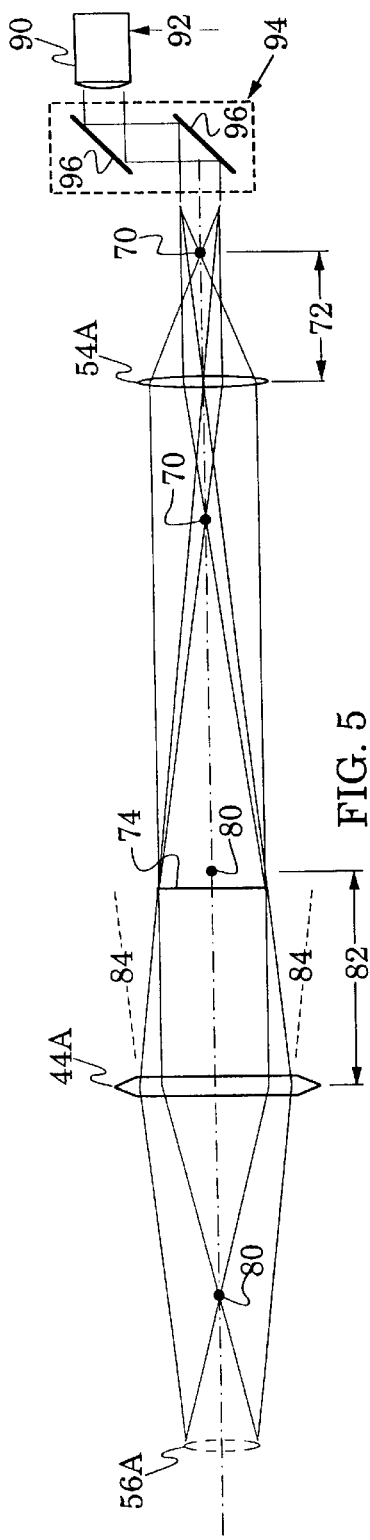

AUTOSTEREOSCOPIC DISPLAY AND METHOD

BACKGROUND OF THE INVENTION

1. Field of the Invention

The present invention relates generally to optical displays and more particularly to stereoscopic displays.

2. Description of the Related Art

The ability to stereoscopically observe different spatial views of an object is of considerable value in many fields. For example, different spatial stereoscopic views of a body element, e.g., a heart, can be useful in medical training, diagnosis and evaluation. Similar views of a proposed automobile design could be helpful in design evaluation. Other exemplary fields of use include air traffic control, CAD/CAM design and military training and tactical/situational awareness displays. Preferably, such stereoscopic views are presented so that an observer can "walk around" the display and see views similar to those which would be seen if walking around the object or objects displayed.

FIG. 1 illustrates a conventional holographic autostereoscopic display system 20 which includes a plurality of image sources in the form of cathode ray tubes 22A, 22B, 22C - - - 22N and a plurality of relay lenses 24A, 24B, 24C - - - 24N (in which N represents a selectable number). Each of the relay lenses 24A, 24B, 24C - - - 24N (relay lenses are also referred to as projection lenses) is positioned with a respective one of the cathode ray tubes 22A, 22B, 22C - - - 22N to form a real image (not shown). The display 20 also incudes a transmissive, planar holographic member 26 which is formed with a plurality of holographic optical elements (HOE) 28 that are arranged in a layered relationship.

A first one of the layered HOEs 28 is configured to process image information from the image source 22A and form an exit pupil 30A. A second one of the layered HOEs 28 is configured to process image information from the image source 22B and form an exit pupil 30B (the processing associated with image sources 22A and 22B is schematically indicated by projection lines 29). The remaining HOEs similarly process image information from image sources 22C - - - 22N to form exit pupils 30C - - - 30N. The display system 20 is arranged to space each of the exit pupils 30A, 30B, 30C - - - 30N one interpupillary distance (IPD) from any adjacent exit pupil.

When the image sources 22A, 22B, 22C - - - 22N form N real images of an object, a viewer can observe a stereoscopic view of the object by positioning his eyes at an adjacent pair of the viewing pupils 30A, 30B, 30C - - - 30N. Although the stereoscopic display system 20 provides stereoscopic views of an object, the displayed visual information is limited because the planar holographic member 26 requires the exit pupils 30A, 30B, 30C - - - 30N to be linearly arranged.

In addition, all of the visual data is processed through the same processing aperture, i.e., the planar holographic member 26. For example, even though visual data from the image source 22A need only be processed by its respective one of the HOEs 28, this data passes through all of the other HOEs 28 along with visual data from image sources 22B - - - 22N. Passing all of the visual data through the same processing aperture typically increases optical degradation effects, e.g., crosstalk, absorption loss and color shift, in the observed view at the exit pupils 30A, 30B, 30C - - - 30N. Excessive absorption loss is also introduced because the visual data must past through all of the layers of a common processing aperture. Data processing problems which are associated with a common processing aperture typically increase as the number of processed images increases.

SUMMARY OF THE INVENTION

The present invention is directed to displays which present high-quality, stereoscopic images of an object in which each image represents a different spatial view of the object. Preferably, multiple viewers can "walk around" the displays and simultaneously view different spatial aspects of the object, e.g., front, side, back and top. These images are viewed without the need for viewing aids, i.e., the displays are autostereoscopic displays.

These goals are achieved with the realization that autostereoscopic views of an object can be formed by generating a plurality of real images which each represent a different spatial view of the object and processing each of these real images through a different processing aperture to form a different one of a plurality of exit pupils. Each exit pupil is the position at which the radiant energy density of its respective real image is maximized.

Each of the exit pupils is spaced substantially one interpupillary distance (IPD) from at least one other of the exit pupils so that a viewer can observe a view of the object by positioning his eyes at a pair of adjacent exit pupils. Another viewer can simultaneously observe a different spatial view of the object by positioning his eyes at a different pair of adjacent exit pupils. The quality of the stereoscopic images is improved by processing each of the real images through a different processing aperture and thereby avoiding the optical degradation, e.g., crosstalk, absorption loss and color shift, that would result if the images were processed through a common processing aperture.

In one display embodiment, a plurality of optical field elements is combined with a projection system that is configured to form a plurality of real images. Each optical field element is spaced no further than its focal length from a different one of the real images to process that real image into one of a plurality of exit pupils at which the radiant energy density of that real image is maximized. Preferably, each optical field element is positioned coincident with its respective real image or is spaced from its respective real image by a few thicknesses of the optical field element.

The optical field elements and the projection system are arranged to space each of the exit pupils substantially one interpupillary distance (IPD) from at least one other of the exit pupils. Preferably, the optical field elements are arranged in a contiguous relationship and are further arranged to form a geometric shape, e.g., a hemisphere, which is selected to enhance the stereoscopic views for the intended application.

One projection system embodiment includes a plurality of conventional image sources (e.g., active matrix liquid crystal displays or cathode ray tubes) and a plurality of relay lenses (relay lenses are also referred to as projection lenses). In another projection system embodiment, the plurality of image sources is replaced by a single time-multiplexed image source which is configured to display a plurality of successive images. In this embodiment, an optical transmission system routes each successive image to a respective optical field element.

The teachings of the invention are equally applicable to the display of monochrome and color images of single or multiple objects.

The novel features of the invention are set forth with particularity in the appended claims. The invention will be best understood from the following description when read in conjunction with the accompanying drawings.

BRIEF DESCRIPTION OF THE DRAWINGS

FIG. 3 is a side view of an image source, relay lens and an optical field element combination in the autostereoscopic display of FIG. 2;

FIG. 4 is a view similar to FIG. 3 in which the optical field element of FIG. 3 is a holographic optical element;

FIG. 5 is a view similar to FIG. 3 in which the optical field element is a Fresnel lens and the image source is replaced by a time-multiplexed image source and an optical transmission system.

DETAILED DESCRIPTION OF THE PREFERRED EMBODIMENTS

Figure 2:
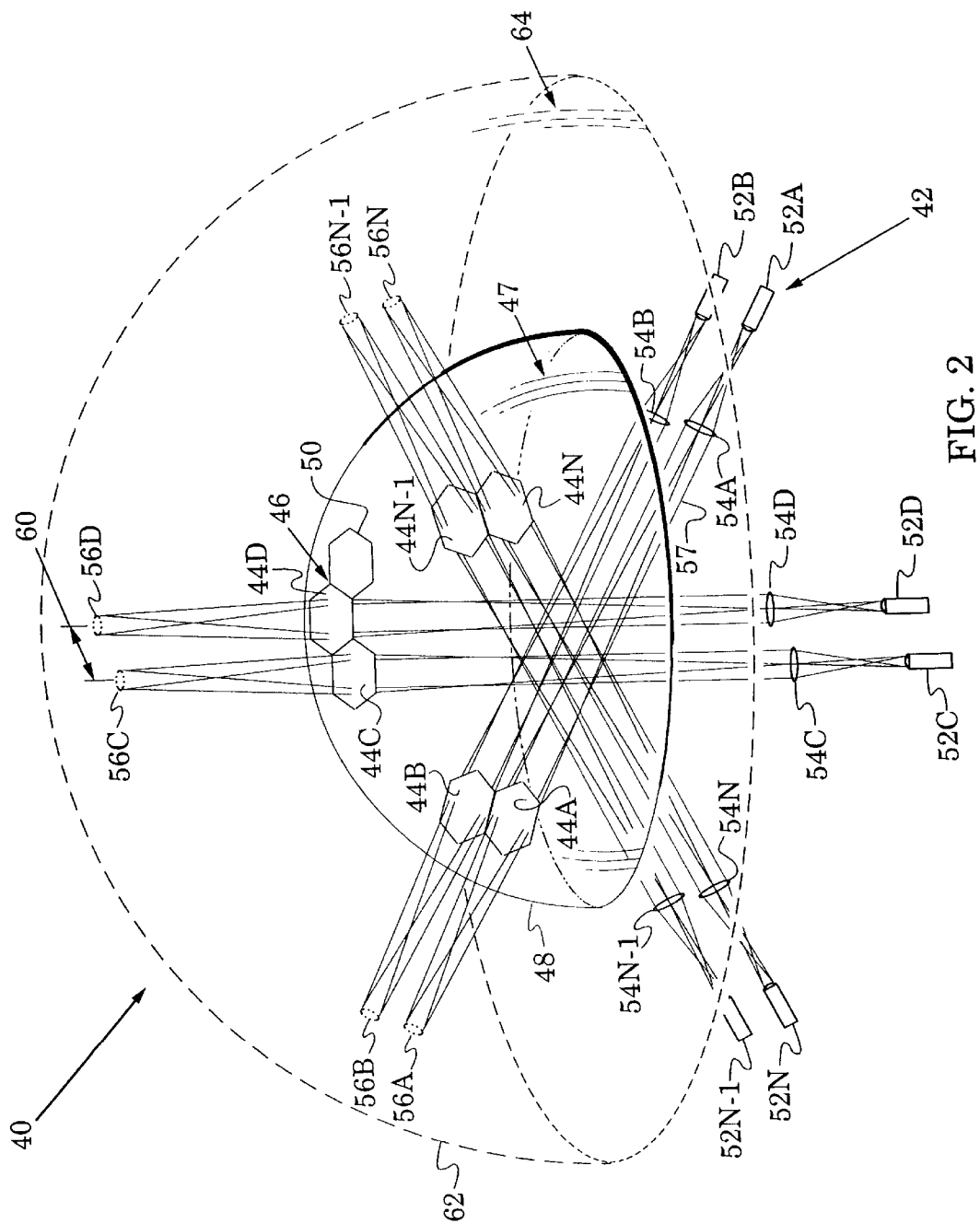
FIG. 2 is a perspective view of a multipupil autostereoscopic display system in accordance with the present invention.

FIG. 2 illustrates a stereoscopic display system 40 in accordance with the present invention. In the system 40, a projection system 42 directs visual data to a plurality of field lenses 44A, 44B, 44C, 44D - - - 44N-1, 44N which are arranged in a contiguous relationship 46 and are further arranged so that, together, they form a display member 47 that has the geometric shape of a hemisphere 48 (although the field lenses contiguously form the display member 47, only exemplary field lenses are shown for clarity of illustration). The contiguous relationship 46 and the hemispheric shape 48 are facilitated because each of the field lenses has the shape of a hexagon 50.

The projection system 42 includes a plurality of image sources 52A, 52B, 52C, 52D - - - 52N-1, 52N and associated relay lenses 54A, 54B, 54C, 54D - - - 54N-1, 54N (in which N represents a selectable number). Imagery generated by the image source 52A and its respective relay lens 54A is processed through the field lens 44A to form an exit pupil 56A (this processing is indicated by projection lines 57). Imagery generated by the image source 52B and its respective relay lens 54B is processed through the field lens 44B to form another exit pupil 56B.

In a similar manner, the imagery from each of the image sources 52C, 52D - - - 52N-1, 52N and its respective one of the relay lenses 54C, 54D - - -54N-1, 54N is processed through a respective one of the field lenses 44C, 44D - - - 44N-1, 44N to form exit pupils 56C, 56D - - - 56N-1, 56N. The projection system 42 and the relay lenses 54A, 54B, 54C, 54D - - - 54N-1, 54N are arranged to position each of the exit pupils 56A, 56B, 56C, 56D- - -56N-1, 56N an IPD space from at least one other of the exit pupils (e.g, as shown by the IPD space 60 between exit pupils 56C and 56D).

Because the field lenses 44A, 44B, 44C, 44D - - - 44N-1, 44N are contiguously arranged in the shape of the hemisphere 48, the exit pupils 56A, 56B, 56C, 56D - - - 56N-1, 56N lie in a three-dimensional viewing space 62 which has the shape of a hemisphere 64 that is larger than the hemisphere 48 and is concentric with that hemisphere.

In operation, each of the image sources 52A, 52B, 52C, 52D - - - 52N-1, 52N generates an image which represents a different spatial view of an object, e.g., an automobile. These images are allocated to the image sources 52A, 52B, 52C, 52D - - - 52N-1, 52N so that the views presented at the exit pupils 56A, 56B, 56C, 56D - - - 56N-1, 56N spatially correspond to the spatial origins of those views.

For example, the images presented at exit pupils 56A and 56B represent views of an automobile which have the same angular separation as the angular separation of the exit pupils themselves. Continuing with this example, if the images presented at exit pupils 56A and 56B represent views of one side of the automobile, then the images presented at exit pupils 56N-1 and 56N represent views of another side of the automobile and images presented at exit pupils 56C and 56D represent views of the top of the automobile.

If an observer positions his eyes at the exit pupils 56A and 56B, he sees a stereoscopic view of one side of the automobile and if he moves his eyes to exit pupils 56C and 56D and then to exit pupils 56N-1 and 56N he successively sees a stereoscopic view of the top of the automobile and a stereoscopic view of another side of the automobile. Alternatively, three observers can place their eyes at these pairs of exit pupils and simultaneously see different stereoscopic views of the automobile. Because of its hemispheric form, the display system 40 presents stereoscopic views over a solid angle of substantially $2\pi$ steradians.

In the stereoscopic display system 40, the image data which corresponds to each view of the displayed object is processed through a different processing aperture, i.e., through a different one of the field lenses 44A, 44B, 44C, 44D - - - 44N-1, 44N. Accordingly, crosstalk between sets of visual data is reduced. In addition, each data set only incurs the absorption loss of a single processing aperture. Because the field lenses 44A, 44B, 44C, 44D - - - 44N-1, 44N are discrete optical elements, they can be arranged in a geometric shape, e.g., the hemisphere 48 of FIG. 2, that spatially corresponds to the object which is imaged.

The image processing of FIG. 2 is shown in more detail in FIG. 3 with reference to an exemplary set of the image sources, relay lenses and field lenses of FIG. 2. In FIG. 3, the relay lens 54A has focal points 70 which are spaced from it by a focal length 72. The relay lens 54A is spaced from the image source 52A by a space greater than the focal length 72 so that a real image 74 is formed. The image source 52A can be any conventional image source, e.g., a cathode ray tube, an active matrix liquid crystal display 77 (which is shown adjacent the image source 52A) or any other flat-panel display.

The field lens 44A has a thickness 79 and a focal point 80 which is spaced from it by a focal length 82. The field lens 44A is spaced no more than its focal length 82 from either side of the real image 74. As shown in FIG. 3, it is preferably spaced less than a few, e.g., one or two, lens thicknesses 79 from the real image 74 and, more preferably, it is positioned coincident with the real image 74 as indicated by the broken line position 84. Spherical aberration, coma and astigmatism are reduced by positioning the field lens 44A coincident with the real image 74. However, negative visual artifacts (caused by dust and other particulate matter) may be objectionable at this position. The visibility of these artifacts is reduced by slightly spacing the lens from coincidence.

The field lens 44A forms an image of the relay lens 54A (more particularly, the aperture stop of the relay lens 54A) at a point in space represented by the exit pupil 56A. The exit pupil 56A is the position at which the radiant energy density of the image is maximized. Therefore, it is the optimum position for placement of an observer's eye when viewing the image formed by the field lens 44A and the relay lens 54A. The image data from the image source 52A is processed through the processing aperture represented by the field lens 44A. As shown in FIG. 2, the image data from others of the image sources 52B, 52C - - - 52N–1, 52N are similarly processed through their respective field lenses, i.e., processing apertures.

FIG. 4 is similar to FIG. 3, with like elements represented by like reference numbers. FIG. 4 shows that the processing function of the field lens 44A can be performed by a holographic optical element (HOE) 87. Basically, in the arrangement of FIG. 4, refraction processes of the field lens 44A are replaced by diffraction processes of the HOE 87. Similar to the field lens 44A, the HOE 87 is preferably positioned less than a few of its thicknesses 88 from the real image 74 and, more ideally, is positioned coincident with the real image 74 as indicated by the broken line position 89.

The projection system 42 of FIG. 2 can be simplified by the use of a single time-multiplexed image source 90 as shown in FIG. 5. FIG. 5 is similar to FIG. 3 with like elements represented by like reference numbers. The time-multiplexed image source 90 displays successive images in response to a timing signal 92. These successive images are then transmitted to their respective field lens by a conventional optical transmission system 94. The optical transmission system 94 routes the successive images along image paths as indicated by ray sets 95A, 95B and 95N.

Each of these successive ray sets is sent by the optical transmission system 94 to a respective relay lens as exemplified by the connection between the ray set 95B and the relay lens 54A. The optical transmission systems can be formed with various conventional transmission elements, e.g., mirrors and switched optical fibers. A completely solid state projection system can be obtained by using a solid state display, e.g., an active matrix liquid crystal display, for the image source 90.

The formation of the exit pupil 56A in FIG. 3 can be performed by any optical field element which can process a real image into an exit aperture from which an image of maximum radiant energy density can be viewed. Exemplary optical field elements include the classical field lens 44A of FIG. 3 (a positive refractive lens, e.g., a double convex lens), the HOE 87 of FIG. 4 and a Fresnel lens such as the Fresnel lens 98 shown in FIG. 5. Because of its stepped structure, the Fresnel lens 98 occupies less volume than the classical field lens 44A of FIG. 3. For clarity of illustration, the stepped Fresnel lens 98 is spaced a few of its thicknesses from the real image 74.

Figure 1:
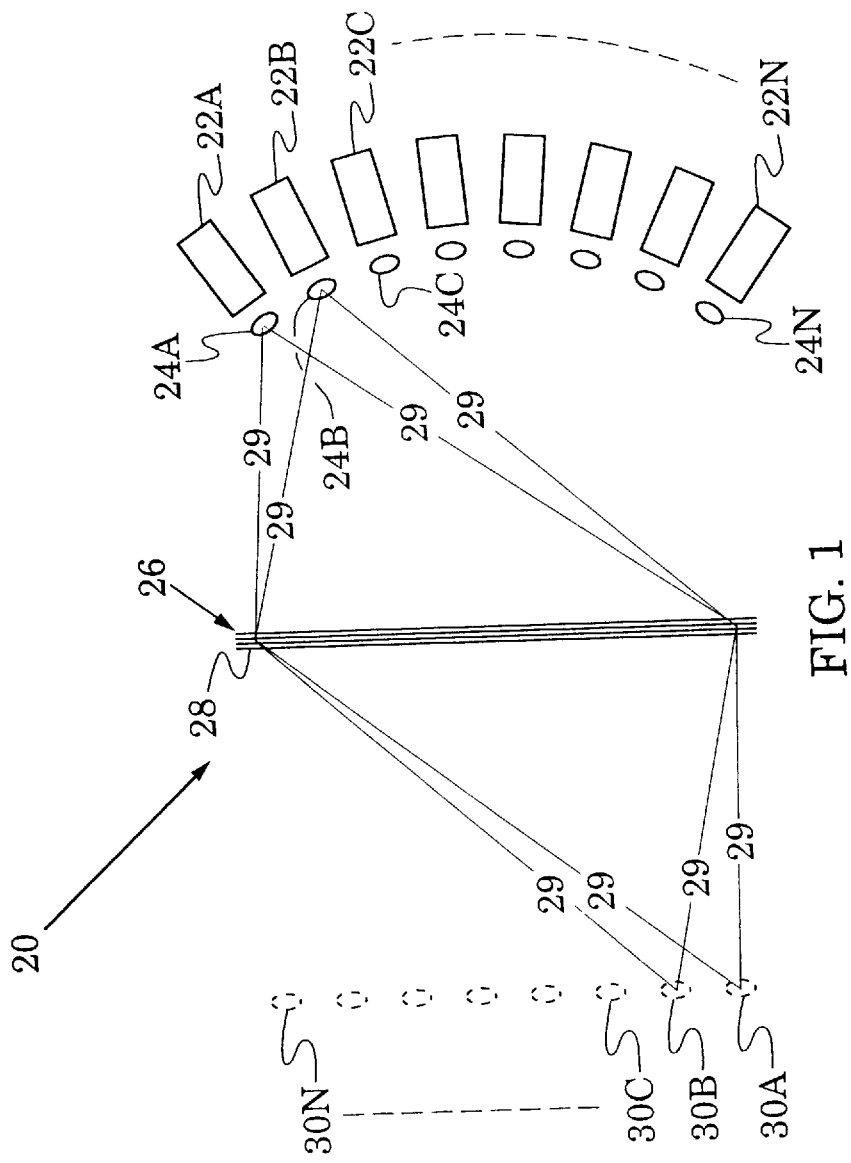
FIG. 1 is a plan view of a prior art multipupil autostereoscopic display systems.

The optical field elements of the invention, e.g., the field lenses 44A, 44B, 44C, 44D - - - 44N–1, 44N of FIG. 1, are preferably positioned in a contiguous relationship to facilitate the formation of a display member (e.g., the display member 47 of FIG. 1). In addition, the contiguous relationship facilitates realization of the IPD spacing of the exit pupils.

The hemispheric display member 47 of FIG. 2 can be realized with hexagonal optical field elements whose outer faces correspond with the hemispheric shape or with flat-faced hexagonal optical field elements, i.e., the outer surface of the display member 47 may be formed with a smooth or a faceted surface.

Figure 6:
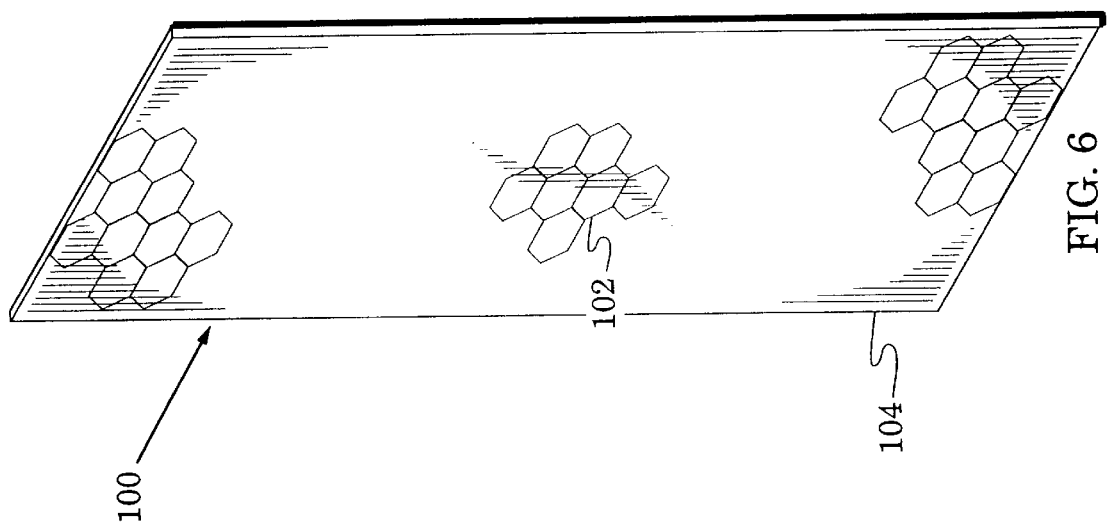
FIG. 6 is a perspective view of another autostereoscopic display member.

Although a hexagonal shape is particularly useful in forming these contiguous relationships, other optical field element shapes, e.g., pentagonal, may be substituted. Preferably, the optical field elements are arranged to give the display member a geometric shape which enhances the objects being displayed. In addition to the three-dimensional hemispheric shape 48 of the display member 47, another exemplary geometric shape is illustrated by the display member 100 of FIG. 6.

The display member 100 is formed with a plurality of contiguously arranged optical field elements 102 (for clarity of illustration, only exemplary field elements are shown) that are arranged in the shape of a two-dimensional plane 104. The hemispheric shape 48 of the display member 47 could enhance the stereoscopic display of images of an object which is typically viewed from spatially opposed positions, e.g., a proposed automobile design. The planar shape 104 of the display member 100 requires less space than the hemispheric shape 48. If desired, various other views can be displayed with the display member 100 by causing the image sources (e.g., the image source 52A of FIG. 3) to sequentially generate spatially different views.

Autostereoscopic display systems of the invention avoid a significant source of crosstalk between optical signals (a common processing aperture) because each source of image data is processed through its own processing aperture. Not only do these systems reduce the opportunity for crosstalk but they reduce absorption losses compared to conventional systems which use a common processing aperture. Display systems of the invention facilitate "walk around" viewing by a plurality of simultaneous viewers. They involve no moving parts, can be adapted to a completely solid state configuration and do not require viewing aids, e.g., polarizing glasses. The teachings of the invention are equally applicable to the display of monochrome and color images.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An autostereoscopic display, comprising:

a projection system configured to form a plurality of real images; and a plurality of optical field elements arranged in a contiguous relationship, each having a focal length and spaced no further than its focal length from a different one of said real images to process that real image into one of a plurality of exit pupils at which the radiant energy density of that real image is maximized;

wherein said projection system and said optical field elements are arranged to space each of said exit pupils substantially one interpupillary distance (IPD) from at least one other of said exit pupils.

2. The autostereoscopic display of claim 1, wherein said optical field elements form a selected geometric shape.

3. The autostereoscopic display of claim 2, wherein said geometric shape is a three-dimensional hemisphere.

4. The autostereoscopic display of claim 2, wherein said geometric shape is a two-dimensional plane.

5. The autostereoscopic display of claim 1, wherein each of said optical field elements has a thickness and is spaced less than twice said thickness from its respective real image.

6. The autostereoscopic display of claim 1, wherein each of said optical field elements is positioned coincident with its respective real image.

7. The autostereoscopic display of claim 1, wherein each of said optical field elements is a positive, refractive lens.

8. The autostereoscopic display of claim 1, wherein each of said optical field elements is a holographic optical element.

9. The autostereoscopic display of claim 1, wherein each of said optical field elements is a Fresnel lens.

10. The autostereoscopic display of claim 1, wherein said projection system includes:
   a plurality of image sources; and
   a plurality of relay lenses with each of said relay lenses sufficiently spaced from a different one of said image sources to process it into one of said real images.

11. The autostereoscopic display of claim 10, wherein each of said relay lenses has a focal length and is spaced greater than its focal length from its respective image source.

12. The autostereoscopic display of claim 10, wherein each of said image sources is a cathode ray tube.

13. The autostereoscopic display of claim 10, wherein each of said image sources is an active matrix liquid crystal display.

14. The autostereoscopic display of claim 10, wherein each of said image sources is a flat-panel display.

15. The autostereoscopic display of claim 1, wherein said projection system includes:
   a plurality of relay lenses;
   a time-multiplexed image source configured to display a plurality of successive images; and
   an optical transmission system configured to transmit each of said successive images to a respective one of said relay lenses.

16. The autostereoscopic display of claim 1 wherein the field elements form a hemispheric shape.

17. A display member for forming an autostereoscopic display from a plurality of real images, comprising a plurality of optical field elements wherein:
   said optical field elements are configured to each process a different one of said real images into one of a plurality of exit pupils at which the radiant energy of that real image is maximized;
   said optical field elements are positioned to space each of said exit pupils substantially one interpupillary distance (IPD) from at least one other of said exit pupils; and
   said optical field elements are arranged in a contiguous relationship to form a selected geometric shape.

18. The display member of claim 17, wherein each of said optical field elements has a focal length and is spaced no further than its focal length from its respective real image.

19. The display member of claim 17, wherein each of said optical field elements has a thickness and is spaced less than twice said thickness from its respective real image.

20. The display member of claim 17, wherein each of said optical field elements is positioned coincident with its respective real image.

21. The display member of claim 17, wherein said geometric shape is a hemisphere.

22. The display member of claim 17, wherein said geometric shape is a plane.

23. The display member of claim 17, wherein each of said optical field elements is a positive, refractive lens.

24. The display member of claim 17, wherein each of said optical field elements is a holographic optical element.

25. The display member of claim 17, wherein each of said optical field elements is a Fresnel lens.

26. A method of displaying autostereoscopic views of an object, comprising:
   generating a plurality of real images which each represent a different spatial view of said object; and
   processing each of said real images through a different processing aperture to form a different one of a plurality of exit pupils at which the radiant energy density of that real image is maximized; and
   positioning each of said exit pupils along the surface of a hemisphere substantially one interpupillary distance (IPD) from at least one other of said exit pupils.

27. The method of claim 26, wherein said processing aperture is an optical field element.

28. The method of claim 27, wherein said optical field element is a positive, refractive lens.

29. The method of claim 27, wherein said optical field element is a holographic optical element.

30. The method of claim 27, wherein each of said optical field elements is a Fresnel lens.

31. An autostereoscopic display, comprising:
   a projection system configured to form a plurality of real images; and
   a plurality of optical field elements arranged in a hemispheric shape, each having a focal length and spaced no further that its focal length from a different one of said real images to process that real image into one of a plurality of exit pupils at which the radiant energy density of that real image is maximized;
   wherein said projection system and said optical field elements are arranged to space each of said exit pupils substantially one interpupillary distance (IPD) from at least one other of said exit pupils.

32. An autostereoscopic display, comprising:
   a projection system configured to form a plurality of real images; and
   a plurality of optical field elements arranged to create exit pupils in a hemispheric relationship, each having a focal length and spaced no further than its focal length from a different one of said real images to process that real image into one of a plurality of exit pupils at which the radiant energy density of that real image is maximized;
   wherein said projection system and said optical field elements are arranged to space each of said exit pupils substantially one interpupillary distance (IPD) from at least one other of said exit pupils.

33. An autostereoscopic display, comprising:
   a projection system configured to form a plurality of real images, wherein said projection system including;
   a plurality of image sources; and
   a plurality of relay lenses with each of said relay lenses sufficiently spaced from a different one of said image sources, wherein each of said image sources is a cathode ray tube to process it into one of said real images; and
   a plurality of optical field elements arranged in a contiguous relationship, each having a focal length and spaced no further than its focal length from a different one of said real images to process that real image into one of a plurality of exit pupils at which the radiant energy density of that real image is maximized;
   wherein said projection system and said optical field elements are arranged to space each of said exit pupils substantially one interpupillary distance (IPD) from at least one other of said exit pupils.

34. An autostereoscopic display, comprising:
   a projection system configured to form a plurality of real images, wherein said projection system including;
   a plurality of image sources; and
   a plurality of relay lenses with each of said relay lenses sufficiently spaced from a different one of said image sources, wherein each of said image sources is an active matrix liquid crystal display to process it into one of said real images; and a plurality of optical field elements arranged in a contiguous relationship, each having a focal length and spaced no further than its focal length from a different one of said real images to process that real image into one of a plurality of exit pupils at which the radiant energy density of that real image is maximized;

wherein said projection system and said optical field elements are arranged to space each of said exit pupils substantially one interpupillary distance (IPD) from at least one other of said exit pupils.

35. An autostereoscopic display, comprising:

a projection system configured to form a plurality of real images, wherein said projection system including;
 a plurality of image sources; and
 a plurality of relay lenses with each of said relay lenses sufficiently spaced from a different one of said image sources, wherein each of said image sources is a flat panel display to process it into one of said real images; and a plurality of optical field elements arranged in a contiguous relationship, each having a focal length and spaced no further than its focal length from a different one of said real images to process that real image into one of a plurality of exit pupils at which the radiant energy density of that real image is maximized;

wherein said projection system and said optical field elements are arranged to space each of said exit pupils substantially one interpupillary distance (IPD) from at least one other of said exit pupils.

36. An autostereoscopic display, comprising:

a projection system configured to form a plurality of real images, said projection system including:
 a plurality of relay lenses;
 a time-multiplexed image source configured to display a plurality of successive images; and
an optical transmission system configured to transmit each of said successive images to a respective one of said relay lenses; and a plurality of optical field elements arranged in a contiguous relationship, each having a focal length and spaced no further than its focal length from a different one of said real images to process that real image into one of a plurality of exit pupils at which the radiant energy density of that real image is maximized;

wherein said projection system and said optical field elements are arranged to space each of said exit pupils substantially one interpupillary distance (IPD) from at least one other of said exit pupils.

37. An autostereoscopic display, comprising:

a projection system configured to form a plurality of pairs of real images, and a plurality of optical field elements arranged in a contiguous relationship each having a focal length and spaced no further than its focal length from a different one of said real images to process each of said pairs of images into a corresponding pair of exit pupils.

* * * * *